April 9, 1963   J. C. CULLINAN ETAL   3,084,553
SOIL GAS DETECTING APPARATUS
Filed March 7, 1960   2 Sheets-Sheet 1
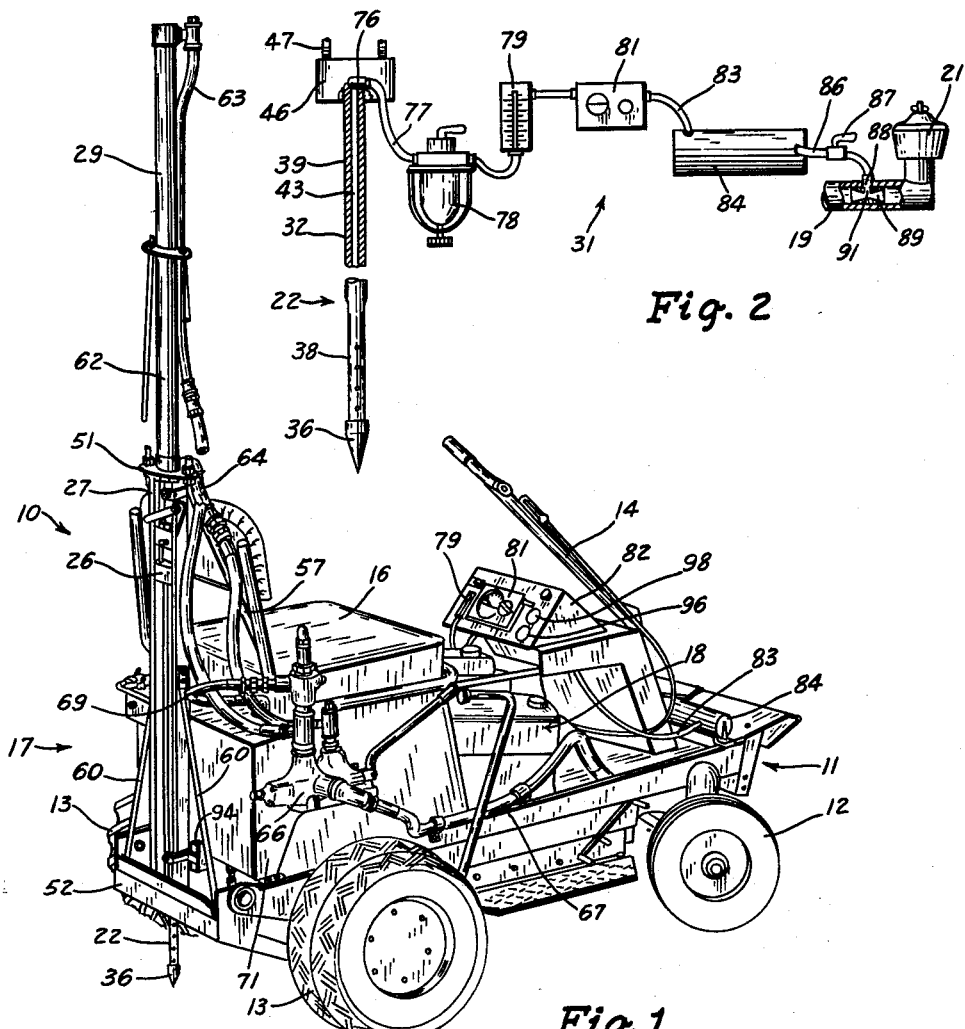
Fig. 2
Fig. 1
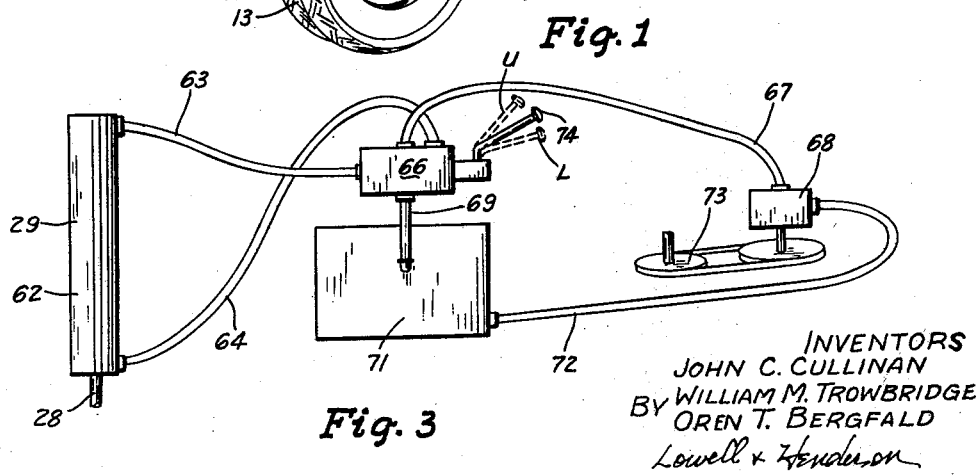
Fig. 3
INVENTORS
JOHN C. CULLINAN
BY WILLIAM M. TROWBRIDGE
OREN T. BERGFALD
Lowell & Henderson
ATTORNEYS April 9, 1963 J. C. CULLINAN ETAL 3,084,553
SOIL GAS DETECTING APPARATUS
Filed March 7, 1960 2 Sheets-Sheet 2

INVENTORS
JOHN C. CULLINAN
WILLIAM M. TROWBRIDGE
BY OREN T. BERGFALD
Lowell + Henderson
ATTORNEYS

United States Patent Office 3,084,553
Patented Apr. 9, 1963

3,084,553
SOIL GAS DETECTING APPARATUS
John C. Cullinan, William M. Trowbridge, and Oren T. Bergfald, Clarion, Iowa, assignors to Detecto Company, Clarion, Iowa, a corporation of Iowa
Filed Mar. 7, 1960, Ser. No. 13,163
2 Claims. (Cl. 73—421.5)

This invention relates generally to gas detection apparatus and more particularly to a portable, self-propelled gas detector operable by one man for the purpose of detecting underground gas systems leaks.

An object of this invention is the provision of an improved gas leak detecting apparatus.

Another object of this invention is the provision of a portable gas leak detecting apparatus wherein a single operator can operate mechanism to sink a gas collecting probe into the ground and take the resulting readings on indicating instruments, while remaining seated on the apparatus.

Still another object of this invention is to provide a portable apparatus for detecting a gas leak in a gas main wherein a ground insertible hollow probe is adapted to form with the ground an air space from which space air and any entrained gases are continuously exhausted at a predetermined subatmospheric pressure through an explosion meter to immediately indicate the presence or absence of a gas leak in a main along with an indication as to whether or not the leak is dangerous.

Still another object of this invention is to provide a portable apparatus for detecting a gas leak in a gas main wherein a ground insertible hollow probe is adapted to form with the ground an air space from which space air and any entrained gases are exhausted to determine the existence and extent of any gas leak.

A further object of this invention is the provision of a portable gas leak detecting apparatus adapted to carry the operator, which apparatus is small enough to be driven onto and over lawns for quick and easy gas leak detection operations.

Yet another object of this invention is the provision of an improved probe unit which, upon insertion into the ground, forms with the ground an air space about the perforated soil gas ingressive portion of the unit while automatically sealing off the air space from the atmosphere.

Another object of this invention is the provision of a portable gas leak detecting apparatus which is simple in construction, effective in operation, and accurate in its readings.

These objects and other features and advantages of this invention will become readily apparent upon reference to the following description when taken with the accompany drawings, wherein:

FIG. 1 is a perspective view of one embodiment of the portable gas leak detecting apparatus of this invention shown in assembly relation on a self-propelled vehicle, with some parts being broken away for clarity;

FIG. 2 is a schematic showing of the component parts of the gas detecting and measuring system for the apparatus in FIG. 1, certain parts broken away and others shown in section for purposes of clarity;

FIG. 3 is a schematic showing of the hydraulic system for operating the ground probe of the apparatus;

Figures 4, 5:
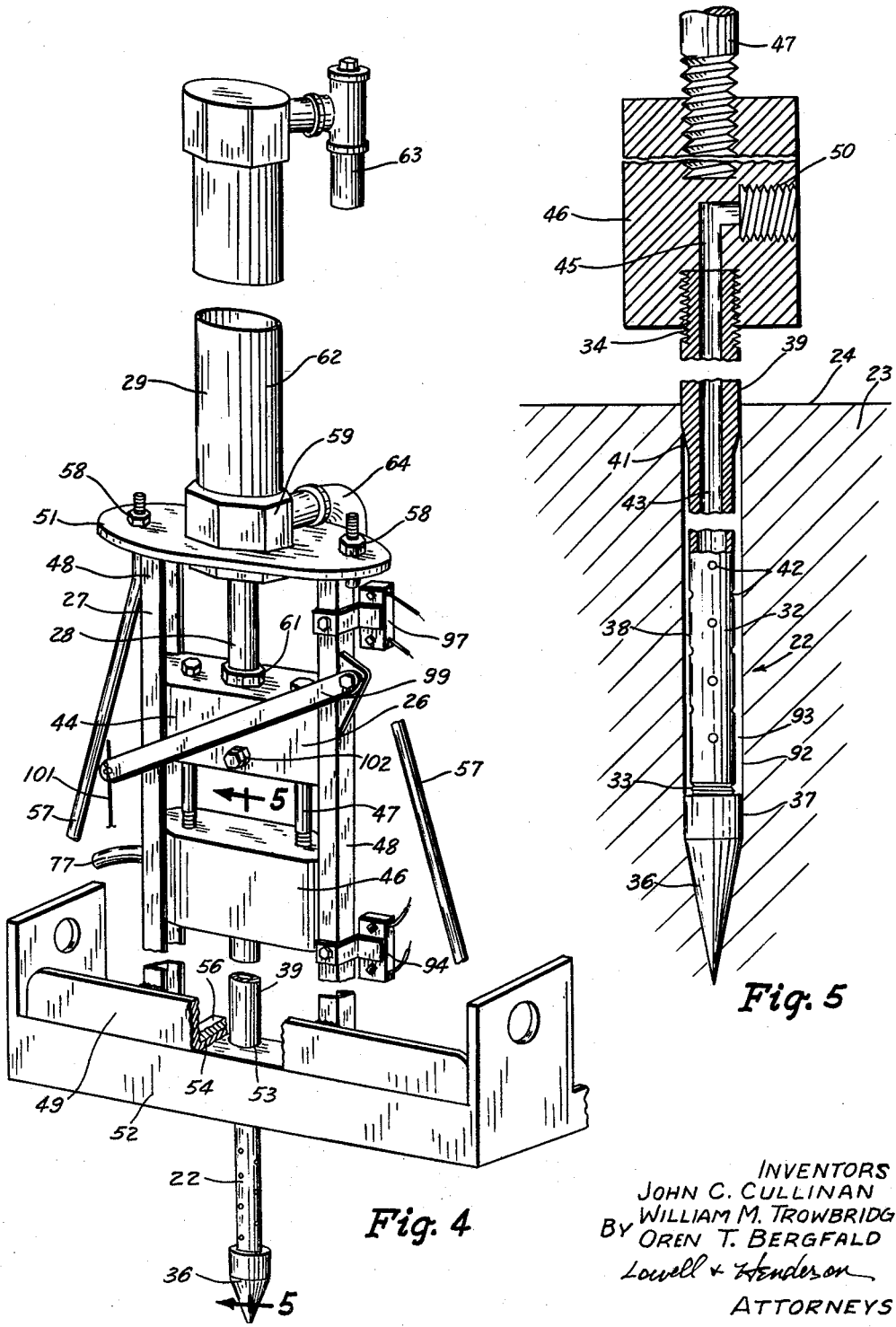
FIG. 4 is an enlarged foreshortened perspective view showing the assembly of the gas detecting probe and its operating mechanism with some parts broken away and others shown in section for illustrative purposes.
FIG. 5 is an enlarged, foreshortened sectional view of the probe taken along the line 5—5 in FIG. 4.

Referring now to the drawings, the gas leak detecting apparatus of this invention is indicated generally at 10 in FIG. 1, and which apparatus 10 is mounted on a portable frame 11 having front and rear pairs of wheels 12 and 13, respectively. The front wheels 12 are used for steering in connection with a steering column 14 and the rear wheels 13 are adapted for driving. A seat 16 is provided for the operator of the apparatus 10; the seat 16, frame 11, and steering column 14 being arranged for a comfortable seating and driving position of the operator during the entire and complete use of the apparatus 10.

Power for driving to the rear wheels 13 is provided by a commercial internal combustion engine mounted on the frame 11 and indicated generally at 18 in FIG. 1. The usual intake manifold 19 (FIG. 2) for the engine 18 is provided in conjunction with the air intake 21 and as a source of suction pressure therefor. At the rear 17 of the frame 11, a probe unit 22 is provided for insertion into the earth 23 (FIG. 5) and below the surface 24 thereof. The probe unit 22 is secured to a crosshead unit 26 (FIGS. 1 and 4) reciprocally mounted on a track structure 27 secured to the frame 11.

The reciprocal crosshead unit 26 is secured in turn to the piston 28 (FIG. 4) of a hydraulically operated, double-acting piston and cylinder unit 29 mounted on top of the track structure 27. As will be described in detail hereinafter, the hydraulic unit 29 is operable by the operator, while seated on the apparatus 10, to move the probe unit 22 via the crosshead unit 26 into and out of the earth 23. When the probe unit is in the earth, readings can be taken by the operator from a gas indicating and measuring system 31 (FIG. 2), which is fluid connected between the probe unit 22 and the intake manifold 19.

The probe unit 22 (FIG. 5) comprises an elongated tubular element 32 threaded externally at its lower end 33 and at its upper end 34. At the lower end 33, a cone-shaped member 36 is threadably secured thereto for piercing the earth. The cone member 36 has a shank 37 of a certain outer diameter which is larger than the outer diameter of the lower portion 38 of the probe element 32. This longitudinal extended portion 38 is separated from the upper portion 39 of the probe element 32 by a shoulder 41, and with the upper portion 39 having an outer diameter larger than that of the lower portion 38 and at least as large as that of the cone shank 37. The purpose for this variance in diameters will be seen hereinafter. A plurality of openings or perforations 42 are formed only in the side walls of the lower, narrower portion 38 of the probe element, and communicate with the longitudinal bore 43 extending the entire length of the probe element 32.

The upper end 34 (FIG. 4) of the probe element 32 is threaded into the lower one of a pair of upper and lower blocks 44 and 46, respectively, interconnected in a lost motion manner by a pair of cap screws 47. The cap screws are threaded into the lower block 46 (FIG. 5) and are inserted through passages (not shown) provided therefor in the upper block 44, whereby the upper block is slidable on the cap screws 47 relative to the lower block 46. A passage 45 (FIG. 5) formed in the lower block 46 registers with the probe element bore 43 and communicates at right angles with a threaded opening 50 in a side of the block 46. The blocks 44 and 46 are slidably mounted in a guided manner in the track structure 27 (FIG. 4), which includes a pair of upstanding parallel channel irons 48 secured at their bases to a transverse angle iron 49 and at their tops to a flat plate 51. The angle iron 49 is secured at its ends to a mounting bracket 52 secured at the rear 17 of the portable frame 11. An opening 53 (FIG. 4) is formed in the bracket 52 through which the probe element 32 reciprocally extends, and openings (not shown) are formed also for the probe element in the horizontal leg 54 of the angle iron 49 and in a guide plate 56 secured on top and centrally of the leg 53.

The flat plate 51 at the top of the track structure 27 (FIG. 4) is adapted to receive a pair of braces 57, secured there by nuts 58, and which extend angularly down for securement to the frame 11 adjacent the seat 11 (FIG. 1). The channel irons 48 are supported by a second pair of braces 60 (FIG. 1) secured at their lower ends to the mounting bracket 52. The plate 51 also has secured thereto the lower end 59 of the piston and cylinder unit 29 from which the piston 28 extends for connection at 61 to the upper block 44. The cylinder 62 of the unit 29 is thus supported and braced in an upstanding manner on the plate 51. It can readily be seen, referring to FIG. 4, that the longitudinal axes of the probe unit 22, the crosshead unit 26, and the piston and cylinder unit 29 are vertically aligned.

Referring to FIG. 3, the unit 29 is shown as being fluid connected by a pair of conduits 63 and 64 to a valve unit 66 (see FIG. 1). The unit 66 is of commercial manufacture and is connected by a supply conduit 67 to a pump 68, and by a by-pass line 69 to a reservoir 71. The reservoir is supported on the frame 11 at the rear thereof and provides support for the operator's seat 16 (FIG. 1). To supply fluid from the reservoir 71 to the pump 68, another conduit 72 is provided. The pump 68 is driven off a belt and pulley unit 73 (FIG. 3) driven by the engine 18. Operation of the valve unit 66, whereby to direct fluid to either the top or the bottom of the cylinder 62, is controlled by a dead man stick or lever 74 biased in a normally neutral position wherein the unit 66 is non-actuated. The lever 74 extends toward the front of the frame 11 adjacent the right side of the seat 16 (FIG. 1).

The gas indicating and measuring system 31, shown in schematic in FIG. 2, includes a probe element 32 fluid connected, via the lower block passage 45 (FIG. 5), through an elbow 76 threaded into the opening 50 (FIG. 5) and by a conduit 77 from the elbow 76, to a filter 78 secured to the left rear of the apparatus 10. In the filter, dirt is removed from the gas and air, or fluid mixture before it is transmitted to a meter 79 which indicates the amount of suction or sub-atmospheric pressure flow. From the pressure indicating meter 79, the gas is directed to a commercial explosion meter 81. The meter 81 includes a visible scale and a pointer therefor whereby the intensity of the soil gas, if any, detected by the probe unit 22 is clearly readable. Referring to FIG. 1, it is seen that both the meters 79 and 81 are mounted in a housing 82 secured to the portable frame 11 directly in front of the operator's seat for quick and easy reading.

From the explosion meter 81, the fluid mixture is transmitted through a conduit 83 (FIGS. 1 and 2) to a surge tank 84 where the suction pulsations on the fluid mixture created by the engine 18 are taken out. The fluid mixture is then transmitted through another conduit 86 to an on-off valve 87, which is shut off when the probe unit 22 is not being used, and thence to an opening 88 formed in the side wall of the intake manifold 19. Within the manifold, a venturi tube 89 has been inserted so that an opening 91 formed centrally therein is aligned with the manifold opening 88. By virtue of the venturi tube 89, the normal suction pressure from the engine 18 of approximately two pounds per square inch is raised to approximately five pounds per square inch before it is applied through the measuring system 31 to the probe element perforations 42.

In the operation of the apparatus 10, its portability enables a seated operator to maneuver the apparatus directly over the location to be tested. It is assumed the crosshead unit 26 (FIG. 1) is at its uppermost position with the probe element 32 out of the ground, wherein the piston 28 is withdrawn within the piston and cylinder unit 29, and with the control lever 74 in its neutral position, shown in full lines in FIG. 3. By moving the control lever 74 to its lower dotted line position L, for example, the unit 29 is hydraulically actuated to force the piston 28 outwardly of the cylinder 62.

The vertical downward movement of the piston 28 is transmitted to the crosshead unit upper block 44 which slams against the top of the lower block 46 to move it downwardly on the track structure 27, thus forcing the probe unit 22 (FIG. 5) into the earth 23. As the cone member 36 enters the earth 23 and is sunk below the surface 24, the shank 37 forms a circular shaft 92 in the earth. Thus, as the lower portion 38 of the probe element 32 has an outer diameter less than that of the shank 37, an air space 93 between the portion 38 and the wall of the shaft 92 is formed. The lower block 46 is moved downwardly until it strikes the guide plate 56, whereat an electric alarm switch 94 mounted near the bottom of the track structure is tripped to operate a visible flasher 96 (FIG. 1) for the operator, who then releases the lever 74 to permit it to move back into its neutral position. At this location of the probe element 32, the shoulder 41 and the upper portion 39 of the probe element 32 have entered the earth 23, thus sealing off the air space 93 from the outside atmosphere.

Assuming fluid mixture in the form of soil gas is escaping from a leak in the vicinity of the probe element 32, the suction in the bore 43 thereof from operation of the engine 18, draws the soil gas through the interstices of the earth and into the air space 93. The soil gas is drawn through the perforations 42, up through the bore 43, and through the remainder of the measuring system 31 (FIG. 2). The operator, having remained seated during this operation, is then immediately able to take accurate readings from the suction pressure indicator meter 79 and the explosion meter 81. Should the amount of suction pressure applied to the measuring system from the intake manifold 19, and increased by the venturi tube 89, need be changed, the operator can quickly vary the engine r.p.m. accordingly.

When the necessary readings have been taken, the operator pulls the control lever 74 to the upper dotted line position U (FIG. 3), whereupon the double-acting piston and cylinder unit 29 operates to pull the probe element 32 out of the earth and back into its non-actuated position. When the crosshead unit 26 reaches the top of the track structure 27, it actuates an upper alarm switch 97 (FIG. 4) signaling the operator by another flasher 98 (FIG. 1) to move the control lever 74 from the upper position U back to the neutral position. The apparatus 10 is then ready to be maneuvered by the portable frame 11 to another location where the probing operation can be repeated.

As a safety measure to prevent moving the frame 11 while the probe unit 22 is in the earth 23, upon downward movement of the crosshead unit 26, a lever 99 (FIG. 4) which is pivoted to a channel iron 48 moves downwardly or in a counter-clockwise direction due to a biased wire 101, only a portion of which is shown. This movement can be transmitted through the wire 101 to disconnect the engine drive, for example, to the rear wheels 13. On upward movement of the unit 26, a nut 102 mounted on the upper block 44 engages and moves the lever 99 upwardly against the bias of the wire 101 to connect the engine drive.

Although a preferred embodiment of this invention has been disclosed herein, it is to be remembered that various changes can be made thereto without departing from the scope of the invention as defined in the appended claims.

We claim:

1. Apparatus for removing and inspecting soil gas from below the earth's surface comprising in combination,
    (a) a vehicle having a frame and wheels,
    (b) an internal combustion engine mounted on said frame and drivably connected to at least one of said wheels, said engine having an intake manifold providing a source of subatmospheric pressure,
(c) probe means including a perforated tubular element having a cone shaped point,
(d) guide means mounting the probe means on the frame for movement substantially normal to the earth's surface,
(e) hydraulic means mounted on said frame in axial alignment with said guide means and probe means and operatively connected to said probe means, said hydraulic means being operated by said engine to force the tubular element of the probe means into and out of the earth's surface,
(f) a fluid transmitting line connected at one end to said probe means and at the other end to said intake manifold whereby a continuous subatmospheric pressure is applied to said probe means for continually withdrawing the soil gas from the earth into said transmitting line, and
(g) means interposed between and in fluid communication with said probe means and said manifold for continually indicating the intensity of the soil gas.

2. Apparatus for removing and inspecting gas from below the surface of a gas containing body comprising in combination,
(a) a vehicle having a frame and wheels,
(b) an internal combustion engine mounted on said frame and having an intake manifold providing a source of subatmospheric pressure,
(c) probe means including a perforated tubular element adapted to be inserted into said body,
(d) guide means mounting the probe means on the frame for movement substantially normal to the surface of said body,
(e) hydraulic means mounted on said frame in axial alignment with said guide means and probe means and operatively connected to said probe means, said hydraulic means being operated by said engine to force the tubular element of the probe means into and out of the body,
(f) a fluid transmitting line connected at one end to said probe means and at the other end to said intake manifold whereby a continuous subatmospheric pressure is applied to said probe means for continually withddawing the gas from the body into said transmitting line, and
(g) means interposed between and in fluid communication with said probe means and said manifold for continually indicating the intensity of the gas.

References Cited in the file of this patent

UNITED STATES PATENTS

| | | |
|---|---|---|
| 634,687 | Hartenfels | Oct. 10, 1899 |
| 2,075,706 | Curtis | Mar. 30, 1937 |
| 2,141,261 | Clark | Dec. 27, 1938 |
| 2,264,966 | Burdick et al. | Dec. 2, 1941 |
| 2,643,858 | Hardman | June 30, 1953 |
| 2,709,368 | Wolfpert | May 31, 1955 |
| 2,879,663 | Thomas | Mar. 31, 1959 |

FOREIGN PATENTS

| | | |
|---|---|---|
| 438,794 | Germany | Dec. 24, 1926 |